(12) United States Patent
Chen Larsson et al.

(10) Patent No.: US 12,082,125 B1
(45) Date of Patent: Sep. 3, 2024

(54) POWER HEADROOM REPORTING FOR MULTIPLE UNIVERSAL SUBSCRIBER IDENTITY MODULES

(71) Applicant: Telefonaktiebolaget LM Ericsson (publ), Stockholm (SE)

(72) Inventors: Maomao Chen Larsson, Lund (SE); Christian Bergljung, Lund (SE); Rongyan Lin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/304,862

(22) Filed: Apr. 21, 2023

(51) Int. Cl.
*H04W 52/36* (2009.01)
*H04W 52/14* (2009.01)
*H04W 52/42* (2009.01)
H04W 84/04 (2009.01)

(52) U.S. Cl.
CPC ....... *H04W 52/365* (2013.01); *H04W 52/146* (2013.01); *H04W 52/42* (2013.01); H04W 84/042 (2013.01)

(58) Field of Classification Search
CPC . H04W 52/365; H04W 52/146; H04W 52/42; H04W 84/042; H04W 36/0094; H04W 76/15; H04W 52/367; H04W 52/40
See application file for complete search history.

(56) References Cited

U.S. PATENT DOCUMENTS

| | | | |
|---|---|---|---|
| 2015/0189604 A1* | 7/2015 | Kim | H04W 52/365 370/329 |
| 2021/0297959 A1* | 9/2021 | Zhou | H04W 24/08 |

FOREIGN PATENT DOCUMENTS

| | | | | |
|---|---|---|---|---|
| EP | 3340732 A1 * | 6/2018 | | H04W 36/0094 |
| EP | 3589016 B1 * | 5/2022 | | H04W 36/0061 |
| WO | 2022192834 A1 | 9/2022 | | |

OTHER PUBLICATIONS

3GPP TS 38.213 V17.4.0; 3rd Generation Partnership Project; Technical Specification Group Radio Access Network; NR; Physical layer procedures for control (Release 17); Dec. 2022, consisting of 258 pages.
3GPP TS 38.321 V17.3.0; 3rd Generation Partnership Project; Technical Specification Group Radio Access Network; NR; Medium Access Control (MAC) protocol specification (Release 17), Dec. 2022, consisting of 251 pages.
(Continued)

*Primary Examiner* — John J Lee
(74) *Attorney, Agent, or Firm* — Weisberg I.P. Law, P.A.

(57) ABSTRACT

A method implemented by a wireless device includes a at least two Universal Subscriber Identity Modules, USIMs, and at least two uplink transmitters, and configured to communicate with a first public mobile network, PLMN, and a second PLMN. First data is transmitted to the first PLMN using a first USIM and the at least two UL Tx and a first power headroom report, PHR, is transmitted to the first PLMN, where the first PHR includes a configured first maximum output power for uplink transmission for the wireless device. Second data is transmitted to the second PLMN using a second USIM and one of the at least two uplink transmitters, and a second PHR is transmitted to the first PLMN. The second PHR has a configured second maximum output power for uplink transmission for the wireless device that is reduced compared to the first maximum output power for uplink transmission.

26 Claims, 9 Drawing Sheets

(56) References Cited

OTHER PUBLICATIONS

3GPP TSG RAN Meeting #95e RP-220955; Title: Revised WID: Dual Transmission/Reception (Tx/Rx) Multi-SIM for NR; Source: vivo; Document for: Approval; Agenda Item: 9.3.2.3; Location and Date: Electronic Meeting, Mar. 17-23, 2022, consisting of 5 pages.
International Search Report and Written Opinion dated Oct. 26, 2023 for International Application No. PCT/EP2023/060532 filed Apr. 21, 2023, consisting of 15-pages.
3GPP TS 36.211 V17.1.0; 3rd Generation Partnership Project; Technical Specification Group Radio Access Network; Evolved Universal Terrestrial Radio Access (E-UTRA); Physical channels and modulation (Release 17); Mar. 2022, consisting of 250-pages.
3GPP TS 36.213 V17.4.0; 3rd Generation Partnership Project; Technical Specification Group Radio Access Network; Evolved Universal Terrestrial Radio Access (E-UTRA); Physical layer procedures (Release 17); Dec. 2022, consisting of 584-pages.
3GPP TSG-RAN WG2 Meeting #121 R2-2301173; Title: UE Capability restriction for Dual-Active MUSIM; Agenda Item: 8.17.2; Source: China Telecom; Document for: Discussion and decision; Feb. 27-Mar. 3, 2023, consisting of 3-pages.

\* cited by examiner

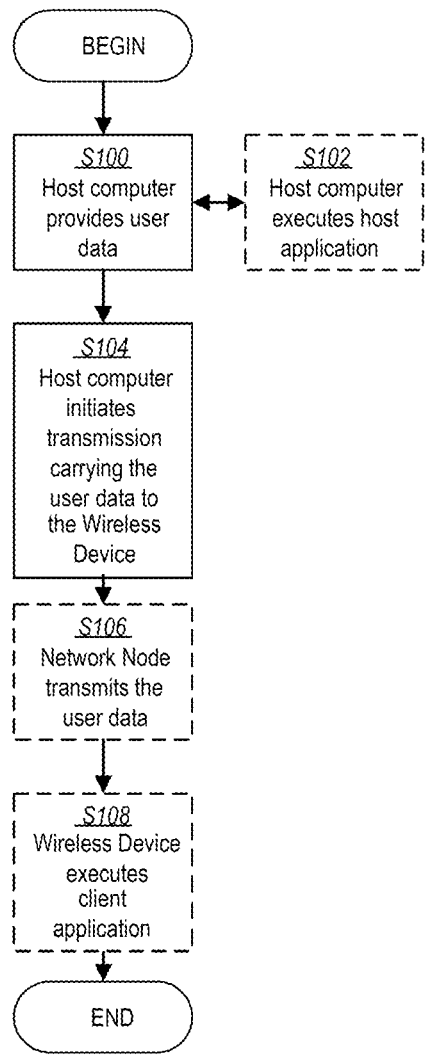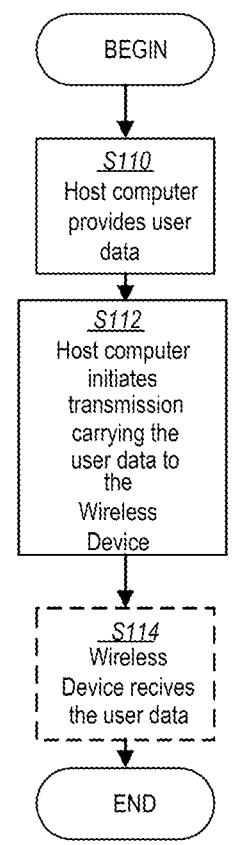
FIG. 3
FIG. 4

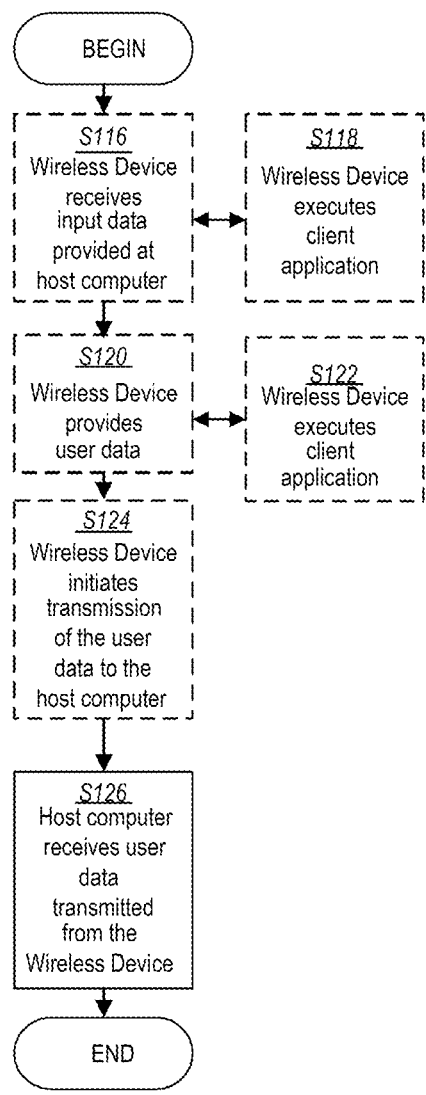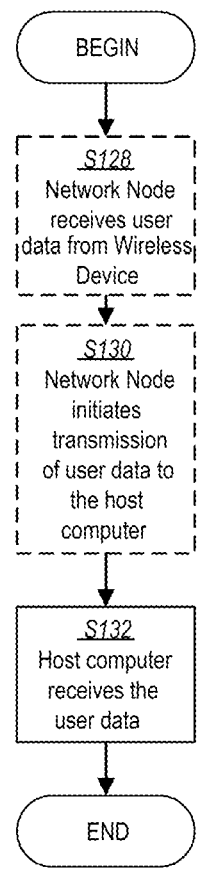
FIG. 5
FIG. 6

| | | | | | | |
|---|---|---|---|---|---|---|
| R | $C_1$ | $C_2$ | $C_3$ | $C_4$ | $C_5$ | $C_6$ | $C_7$ |
| $C_8$ | $C_9$ | $C_{10}$ | $C_{11}$ | $C_{12}$ | $C_{13}$ | $C_{14}$ | $C_{15}$ |
| $C_{16}$ | $C_{17}$ | $C_{18}$ | $C_{19}$ | $C_{20}$ | $C_{21}$ | $C_{22}$ | $C_{23}$ |
| $C_{24}$ | $C_{25}$ | $C_{26}$ | $C_{27}$ | $C_{28}$ | $C_{29}$ | $C_{30}$ | $C_{31}$ |
| PH (Type 2, SpCell of the other MAC entity) | | | | | | V | P |
| $P_{CMAX,f,c}$ 1 | | | | | | | MPE or R |
| PH (Type 1, PCell) | | | | | | V | P |
| $P_{CMAX,f,c}$ 2 | | | | | | | MPE or R |
| PH (Type X, Serving Cell 1) | | | | | | V | P |
| $P_{CMAX,f,c}$ 3 | | | | | | | MPE or R |

...

| | |
|---|---|
| PH (Type X, Serving Cell n) | V | P |
| $P_{CMAX,f,c}$ m | MPE or R |

(a)

| | | | | | | |
|---|---|---|---|---|---|---|
| R | $C_1$ | $C_2$ | $C_3$ | $C_4$ | $C_5$ | $C_6$ | $C_7$ |
| $C_8$ | $C_9$ | $C_{10}$ | $C_{11}$ | $C_{12}$ | $C_{13}$ | $C_{14}$ | $C_{15}$ |
| $C_{16}$ | $C_{17}$ | $C_{18}$ | $C_{19}$ | $C_{20}$ | $C_{21}$ | $C_{22}$ | $C_{23}$ |
| $C_{24}$ | $C_{25}$ | $C_{26}$ | $C_{27}$ | $C_{28}$ | $C_{29}$ | $C_{30}$ | $C_{31}$ |
| PH (Type 2, SpCell of the other MAC entity) | | | | | | V | P |
| $P_{CMAX,f,c}$ 1 | | | | | | | MPE or R |
| PH (Type 1, PCell) | | | | | | V | P |
| $P_{CMAX,f,c}$ 2 | | | | | | | MPE or R |
| PH (Type X, Serving Cell 1) | | | | | | V | P |
| $P_{CMAX,f,c}$ 3 | | | | | | | MPE or R |

...

| | |
|---|---|
| PH (Type X, Serving Cell n) | V | P |
| $P_{CMAX,f,c}$ m | MPE or R |

POWER HEADROOM REPORTING FOR MULTIPLE UNIVERSAL SUBSCRIBER IDENTITY MODULES

FIELD

The present disclosure relates to wireless communications and, in particular, to power headroom reporting for Multi-Universal Subscriber Identity Module Multi-USIM, multi-USIMs.

BACKGROUND

A Multi-Universal Subscriber Identity Module Multi-USIM wireless communication device may be one which holds two SIM cards, which means that the device can handle two different network services. The multi-USIM feature has been commercially available for over 10 years. Multi-USIM has been widely adopted by leading handset manufacturers worldwide and sometimes include adaptations in local markets. For example, the Apple iPhone 12 supports multi-USIM with 2 physical SIM cards in China, while it supports one physical SIM card and one eSIM in all the other regions.

Further, the UE has one overall maximum output transmission power, where the overall maximum transmission power is reported as one of the UE capabilities. Therefore, it may be difficult for the base station to schedule data transmission in appropriate way, especially regarding power management.

SUMMARY

Some embodiments advantageously provide methods, systems, and apparatuses for PHR for MUSIM.

In one embodiment there is provided a network node. The network node configurable to operate in a first public land mobile network, PLMN, including a wireless device, where the wireless device includes at least two Universal Subscriber Identity Modules, USIMs, and at least two uplink transmitters, UL Tx, and is configured to communicate with the first PLMN and a second PLMN. The network node includes a radio interface 82 and processing circuitry 84 configured to receive first data from the wireless device, where the first data is transmitted from the wireless device using a first USIM and the at least two UL Tx, and to receive, from the wireless device, a first power headroom report, PHR, where the first PHR comprises a configured first maximum output power for uplink transmission for the wireless device. Further, the radio interface 82 and processing circuitry 84 are configured receive, from the wireless device, a second PHR, where the second PHR comprises a configured second maximum output power for uplink transmission for the wireless device. The configured second maximum output power for uplink transmission is reduced compared to the first maximum output power for uplink transmission.

In one embodiment there is provided a method. The method is implemented in a network node that is operating in first public mobile network, PLMN, including a wireless device, wherein the wireless device includes at least two Universal Subscriber Identity Modules, USIMs, and at least two uplink transmitters, UL Tx, and is configured to communicate with the first PLMN and a second PLMN. The method includes receiving first data from the wireless device, where the first data is transmitted from the wireless device using a first USIM and the at least two UL Tx and receiving, from the wireless device, a first power headroom report, PHR, where the first PHR comprises a configured first maximum output power for uplink transmission for the wireless device. Further the method includes receiving, from the wireless device, a second PHR, where the second PHR includes a configured second maximum output power for uplink transmission for the wireless device. The configured second maximum output power for uplink transmission is reduced compared to the first maximum output power for uplink transmission.

In further embodiments, the first PHR report is based on the transmission of the first data and the second PHR is based on the transmission of a second data, where the second data is transmitted from the wireless device to the second PLMN using a second USIM and one of the at least two UL Tx.

In one embodiment there is provided a wireless device. The wireless device configured to include at least two Universal Subscriber Identity Modules, USIMs, and at least two uplink transmitters, UL Tx, and configurable to communicate with a first public mobile network, PLMN, and a second PLMN. The wireless device includes a radio interface and processing circuitry configured to transmit first data to the first PLMN using a first USIM and the at least two UL Tx, and to transmit a first power headroom report, PHR, to the first PLMN, where the first PHR comprises a configured first maximum output power for uplink transmission for the wireless device. The radio interface and processing circuitry configured are further configured to transmit second data to the second PLMN using a second USIM and one of the at least two UL Tx, and to transmit a second PHR to the first PLMN, where the second PHR includes a configured second maximum output power for uplink transmission for the wireless device. The configured second maximum output power for uplink transmission is reduced compared to the first maximum output power for uplink transmission.

In one embodiment there is provided another method. The method implemented by a wireless device including a at least two Universal Subscriber Identity Modules, USIMs, and at least two uplink transmitters, UL Tx, and configured to communicate with a first public mobile network, PLMN, and a second PLMN. The method includes transmitting first data to the first PLMN using a first USIM and the at least two UL Tx and transmitting a first power headroom report, PHR, (S142) to the first PLMN, where the first PHR includes a configured first maximum output power for uplink transmission for the wireless device. The method further includes transmitting second data to the second PLMN using a second USIM and one of the at least two UL Tx, and transmitting a second PHR to the first PLMN, where the second PHR comprises a configured second maximum output power for uplink transmission for the wireless device. The configured second maximum output power for uplink transmission is reduced compared to the first maximum output power for uplink transmission.

In further embodiments the first PHR report is based on the transmission of the first data and the second PHR is based on the transmission of the second data.

In other embodiments the second PHR decreases compared to the first PHR.

In further embodiments the first PHR includes at least one PCMAX value and the second PHR comprises at least one PCMAX value, wherein the PCMAX value comprised in the second PHR is PCMAX_C_00.

In one embodiment there is provided a network node. The network node configurable to operate in a first public land mobile network, PLMN, including a wireless device, where the wireless device includes at least two Universal Subscriber Identity Modules, USIMs, and at least two uplink transmitters, UL Tx, and is configured to communicate with the first PLMN and a second PLMN. The network node includes a radio interface 82 and processing circuitry 84 configured to receive first data from the wireless device, where the first data is transmitted from the wireless device using a first USIM and one of the at least two UL Tx, and to receive, from the wireless device, a first power headroom report, PHR, where the first PHR comprises a configured first maximum output power for uplink transmission for the wireless device. Further, the radio interface 82 and processing circuitry 84 are configured receive, from the wireless device, a second PHR, where the second PHR comprises a configured second maximum output power for uplink transmission for the wireless device. The configured second maximum output power for uplink transmission is increased compared to the first maximum output power for uplink transmission.

In one embodiment there is provided a method. The method is implemented in a network node that is operating in first public mobile network, PLMN, including a wireless device, wherein the wireless device includes at least two Universal Subscriber Identity Modules, USIMs, and at least two uplink transmitters, UL Tx, and is configured to communicate with the first PLMN and a second PLMN. The method includes receiving first data from the wireless device, where the first data is transmitted from the wireless device using a first USIM and one of the at least two UL Tx and receiving, from the wireless device, a first power headroom report, PHR, where the first PHR comprises a configured first maximum output power for uplink transmission for the wireless device. Further the method includes receiving, from the wireless device, a second PHR, where the second PHR includes a configured second maximum output power for uplink transmission for the wireless device. The configured second maximum output power for uplink transmission is increased compared to the first maximum output power for uplink transmission.

In further embodiments, the first PHR report is based on the transmission the first data and the second PHR is based on the transmission of a second data, where the second data is transmitted from the wireless device to the second PLMN using a second USIM and the at least two UL Tx.

In one embodiment there is provided a wireless device. The wireless device configured to include at least two Universal Subscriber Identity Modules, USIMs, and at least two uplink transmitters, UL Tx, and configurable to communicate with a first public mobile network, PLMN, and a second PLMN. The wireless device includes a radio interface and processing circuitry configured to transmit first data to the first PLMN using a first USIM and one of the at least two UL Tx, and to transmit a first power headroom report, PHR, to the first PLMN, where the first PHR comprises a configured first maximum output power for uplink transmission for the wireless device. The radio interface and processing circuitry configured are further configured to transmit second data to the second PLMN using a second USIM and the at least two UL Tx, and to transmit a second PHR to the first PLMN, where the second PHR includes a configured second maximum output power for uplink transmission for the wireless device. The configured second maximum output power for uplink transmission is increased compared to the first maximum output power for uplink transmission.

In one embodiment there is provided another method. The method implemented by a wireless device including a at least two Universal Subscriber Identity Modules, USIMs, and at least two uplink transmitters, UL Tx, and configured to communicate with a first public mobile network, PLMN, and a second PLMN. The method includes transmitting first data to the first PLMN using a first USIM and one of the at least two UL Tx and transmitting a first power headroom report, PHR, (S142) to the first PLMN, where the first PHR includes a configured first maximum output power for uplink transmission for the wireless device. The method further includes transmitting second data to the second PLMN using a second USIM and the at least two UL Tx, and transmitting a second PHR to the first PLMN, where the second PHR comprises a configured second maximum output power for uplink transmission for the wireless device. The configured second maximum output power for uplink transmission is increased compared to the first maximum output power for uplink transmission.

In current solutions there is no coordination in UE output transmission power for a communicating with a first and a second PLMN. For example, there may not be enough power for the UE to transmit HARQ-ACK/NACK (Hybrid Automatic Repeat Request-Acknowledgement/No Acknowledgement) feedback to one of the PLMNs. The base station may interpret this as the UE momentarily powers down. The embodiments disclosed herein provide UE implementations that improve the power headroom reporting when MUSIM is used by a UE with multiple Tx. For example, the base station could avoid many of the Discontinuous transmission (DTX) detections and retransmissions during Dual SIM Dual Active (DSDA). The uplink scheduling could switch between single and multiple carriers quickly and there would be no need for RRC reconfiguration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating example methods implemented in a communication system including a host computer, a network node and a wireless device for executing a client application at a wireless device according to some embodiments of the present disclosure;

FIG. 4 is a flowchart illustrating example methods implemented in a communication system including a host computer, a network node and a wireless device for receiving user data at a wireless device according to some embodiments of the present disclosure;

FIG. 5 is a flowchart illustrating example methods implemented in a communication system including a host computer, a network node and a wireless device for receiving user data from the wireless device at a host computer according to some embodiments of the present disclosure;

FIG. 6 is a flowchart illustrating example methods implemented in a communication system including a host computer, a network node and a wireless device for receiving user data at a host computer according to some embodiments of the present disclosure;

FIG. 11 shows Multiple Entry PHR MAC CE with the highest ServCellIndex of Serving Cell with configured uplink is less than 8 (diagram (a)) and equal to or higher than 8 (diagram (b)).

DETAILED DESCRIPTION

Figure 1:
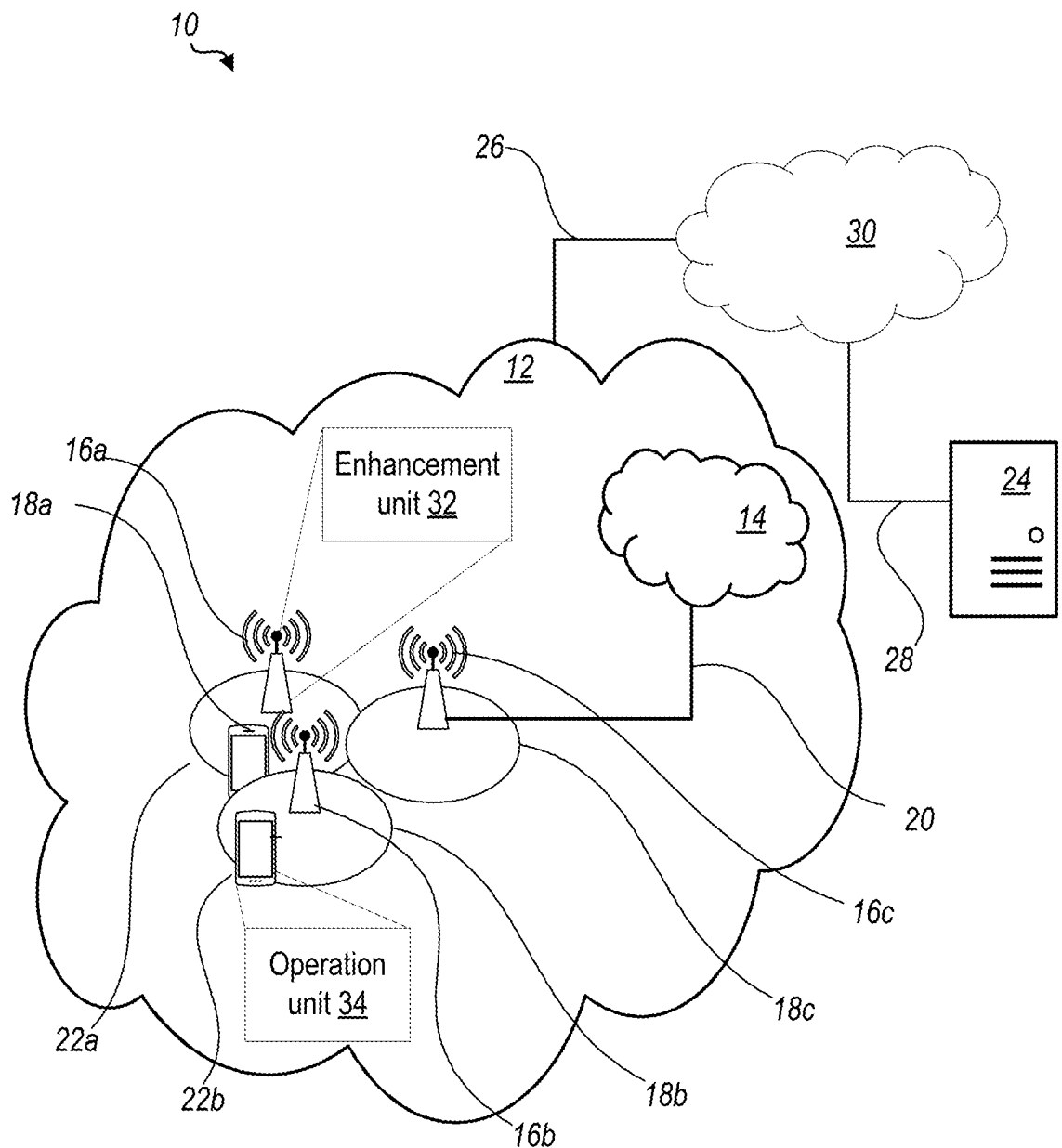
FIG. 1 is a schematic diagram of an example network architecture illustrating a communication system connected via an intermediate network to a host computer according to the principles in the present disclosure.

For MUSIM, the power headroom report (PHR) is not coordinated by the UE for each of the USIMs. Therefore, One or more embodiments, described herein improves PHR for a UE with at least two transceivers (dual-Rx/dual-Tx) and MUSIM, and communicating with a first Public Land Mobile Network (PLMN). When the UE is using one of the Tx for another PLMN the maximum output power available for the transmission to the first PLMN is reduced and thus PHR transmitted to the first PLMN is reduced. The UE thus informs the base station of the reduced output transmission that is available for the UE. The base station can consequently schedule UE transmissions to according to the power available and avoid transmission interruptions such as Discontinuous Transmission (DTX) and reduce the need for retransmissions.

The embodiments disclosed herein are directed to PLMNs. The person skilled in the art will appreciate that the embodiments are also applicable to other types of Networks such as Non-Public Network (NPN).

Some embodiments disclosed herein are directed to UEs having two transceivers (Dual-Rx/Dual-Tx). However, the embodiments are also applicable for UEs with more than two transceivers. Similarly, some embodiments disclosed herein are directed to an UE using or being configured for CA. However, the embodiments disclosed herein are not limited to CA but are also applicable to UEs using or being configured for Dual Connectivity (DC).

In some embodiments transmitting or receiving to or from the PLMN includes transmitting or receiving to or from the network node operating the PLMN. This may include transmitting or receiving data and/or PHR.

Before describing in detail example embodiments, it is noted that the embodiments reside primarily in combinations of apparatus components and processing steps related to PHR reporting. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide power headroom reporting for a UE configured to communicate with a first and a second PLMN using MUSIM. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an enhancement unit 32 which is configured to perform one or more network node 16 functions as described herein such as with respect to PHR reporting for MUSIM. A wireless device 22 is configured to include an operation unit 34 which is configured to perform one or more wireless device 22 functions as described herein such as with respect to PHR reporting for MUSIM.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, store, transmit, receive, forward, relay, determine, configure, reconfigure, etc., information related to PHR reporting for MUSIM that is described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include enhancement unit 32 configured to perform one or more network node 16 functions as described herein such as with respect to PHR reporting for MUSIM.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an operation unit 34 configured to perform one or more wireless device 22 functions as described herein such as with respect to PHR reporting for MUSIM.

Carrier Aggregation.

Carrier Aggregation (CA) is generally used in 3rd Generation Partnership Project (3GPP) New Radio (NR, also referred to as 5th Generation (5G)) and Long Term Evolution (LTE, also referred to as 4th Generation (4G)) systems to improve wireless device transmit/receive data rate as compared to systems which do not use CA. With CA, the wireless device typically operates initially on a single serving cell referred to as a primary cell (Pcell). The Pcell is operated on a component carrier in a frequency band. The wireless device is then configured by the network/network node with one or more secondary serving cells (SCell(s)). Each SCell can correspond to a component carrier (CC) in the same frequency band (intra-band CA) or a different frequency band (inter-band CA) from the frequency band of the CC corresponding to the Pcell. For the wireless device to transmit/receive data on the SCell(s) (e.g., by receiving downlink (DL)-shared channel (SCH) information on a physical downlink shared channel (PDSCH) or by transmitting uplink-shared channel (UL-SCH) information/data on a physical uplink shared channel (PUSCH)), the SCell(s) may need to be activated by the network/network node. The SCell(s) can also be deactivated and later reactivated as needed via activation/deactivation signaling.

Dual Connectivity

Dual Connectivity (DC) is generally used in NR (5G) and LTE systems to help improve wireless device transmit and receive data rates. With DC, the wireless device typically operates with a master cell group (MCG) and a secondary cell group (SCG). Each cell group can have one or more serving cells. The MCG cell, operating on the primary frequency, in which the wireless device either performs the initial connection establishment procedure or initiates the connection re-establishment procedure, is referred to as the primary cell or PCell. The SCG cell in which the wireless device performs random access when performing the Reconfiguration with Sync procedure is referred to as the primary SCG cell or PSCell.

In some cases, the term "primary cell" or "primary serving cell" can refer to PCell for a wireless device not configured with DC, and/or can refer to PCell of MCG or PSCell of SCG for a wireless device configured with DC.

Power Headroom Report

Power headroom indicates how much transmission power left for a UE to use in addition to the power being used by current transmission. Power Headroom can be defined by the equation:

Power Headroom=UE Maximum Output Transmission Power−PUCCH,PUSCH,SRS Power

If the Power Headroom value is positive, it indicates that the UE still have transmission power to transmit data. If the power Headroom value is negative, it indicates that the UE already transmitting at a transmission higher or equal to the maximum output power and there is no output power left to transmit data. PHR is a transmitted as a MAC CE (MAC Control Element) that reports the headroom between the current UE Tx power (estimated power) and the nominal power. The base station uses this report value to estimate how much uplink bandwidth a UE can use for a specific subframe. The more resource block (RB) the UE is using, the higher the UE Tx power, but the UE Tx power should not exceed the maximum output power. There are two triggers for PHR (Power Headroom Report), firstly, Path Loss Change greater than a certain threshold, the UE can calculate the path loss based on reference signal (RS) power notified by network and the measured RS power at UE antenna port. If this value changes over a certain threshold UE transmit PHR. Secondly, by a period timer. The triggers are specified in RRC (Radio Resource Control) messages.

Multi USIM

In wireless communication systems, support for multi-USIM based operations in a UE is handled in an implementation-specific manner without any support from 3rd Generation Partnership Project (3GPP) specifications, resulting in a variety of implementations and UE behaviors. In a multi-USIM device, the USIMs typically share common radio and baseband components. Thus, the multi-USIM device may register in different networks but using one radio front-end (RF) and base band. Legacy Multi-SIM supports Dual SIM Dual Standby (DSDS) type operation. In DSDS only one of the USIM is actively connected to a PLMN with a RRC_Connected mode to receive data, while the other USIM is in an RRC_Idle/RRC_inactive mode. This is based on the legacy UE architecture using Single-Rx or Dual-Rx together with a Single-Tx supported up to Rel-17 of the 3rd Generation Partnership Project (3GPP). For a UE only supporting a Single-Tx the Multi-SIM operations are limited, while the first USIM is in active connected mode (transmitting and/or receiving data) with first USIM the second USIM is in idle mode. There is no possibility for UL feedback from the UE to the network side for the second USIM since the single Tx is occupied by the UL transmissions of the first USIM.

Rel-18 WI for MUSIM

In Release 18 of the 3GPP standard the work on MUSIM was initiated with the below justification:

MUSIM UE's hardware capabilities are shared by the SIMs, and to use the hardware efficiently and economically, the related capabilities need to be dynamically split between the two SIMs. This can lead to a temporary hardware conflict for the UE, which may require UE to release some resources (e.g. SCell/SCG) from one SIM. For example, when the UE's SIM A is in RRC connected state in NW A while the UE's SIM B is in RRC Idle or RRC Inactive in NW B, the two RF chains will be occupied by the SIM A for the communication in NW A. Once the UE's SIM B enters into RRC connected state, one of the RF chains needs to be switched to SIM B. In this case, if the NW A is not aware of the UE's reduced capability change in RF chain, there may be data loss due to demodulation failure and wasting radio resources in NW A. To avoid this, assistance from UE to network A on these temporary UE (capability) restrictions can be beneficial.

The work item (WI) in Release 18 was based on a new UE architecture, Dual Rx/Dual-Tx UE. Dual-Tx, which is a mandatory architecture to support Dual-Connectivity, could also benefits from the Multi-SIM feature since both USIMs can be in active mode with 2 UL chains to support the UL feedback loops.

The objectives of the WI were to specify temporary UE capability with the possibility of releasing the UE capability from one USIM to both USIM, and reenabling the UE capability from both USIM to one USIM.
Enhancements for MUSIM procedures to operate in RRC_CONNECTED state simultaneously in NW A and NW B. [RAN2, RAN3, RAN4].

- Specify mechanism to indicate preference on temporary UE capability restriction and removal of restriction (e.g. capability update, release of cells, (de)activation of configured resources) with NW A when UE needs transmission or reception (e.g., start/stop connection to NW B) for MUSIM purpose
- RAT Concurrency: Network A is NR SA (with CA) or NR DC. Network B can either be LTE or NR.

Applicable UE architecture: Dual-RX/Dual-TX UE
The work item shall identify whether the WI will have RAN3 or RAN4 impacts by RAN #99 [RAN2].
UL Power Control Procedure and PHR
Power Control and Power Capability Power capability determines the maximum UE uplink power per cell or for carrier aggregation (CA). The uplink power remaining given a transmission allocation by the base station is reported to the base station by power headroom reporting.

The UE output power for uplink transmissions UE to BS is controlled independently for each cell c and carrier frequency $f$. The power control for uplink transmissions in a transmission occasion i typically involves both open- and closed-loop control $$P_{f,c}(i)=\min[P_{CMAX,f,c}(i), P_0+\alpha_{f,c}PL_{f,c}+10 \log M_{f,c}(i)+\Delta_{f,c}(i)+\delta_{f,c}(i)]$$

where $P_0$ is the target received power at the receiver (the gNB for NR), $PL_{f,c}$ the path-loss estimate with a weight factor $\alpha_{c,f}$ (the sum $P_0+\alpha_{f,c}PL_{f,c}$ the transmission resources required output power per resource for open-loop control), $M_{f,c}$ the allocated resource bandwidth, $\Delta_{f,c}$ including factors such as the uplink modulation format and $\delta_{f,c}$ a relative power change for closed-loop control.

The output power as determined by open- and closed loop power is limited by the maximum output power $P_{CMAX,f,c}(i)$ configured (computed) by the UE for cell c and carrier frequency $f$. The configured $P_{CMAX,f,c}(i)$ applies for all types of transmissions (PUCCH, PUSCH and SRS) and is in turn capped by the power capability $P_{power\ class}$. For NR in frequency range FR1 below 7 GHz for which the output power can be measured at the antenna connector, the $P_{CMAX,f,c}(i)$ configured can essentially be described by $$P_{CMAX,f,c}(i)\sim\min[P_{power\ class}, f(P_{power\ class}, MPR), P_{Max}]$$

and hence limited by
- the power capability $P_{power\ class}$ of the UE, indicated to the network by UE capability signaling
- a function $f(P_{power\ class}, MPR) \leq P_{power\ class}$ of the power capability and maximum power reductions MPR allowed for compliance with e.g. unwanted emissions requirements
- a cell-specific or UE-specific limitation $P_{Max}$ (absolute) indicated to the UE by the network in the system information broadcasted in the cell or by dedicated signaling to the UE.

The UE is allowed a power-back-off up to MPR (dB) but does not necessarily use the full allowance. The $P_{CMAX,f,c}(i)$ is therefore specified in a range, from [1] for a single serving cell in FR1, The configured maximum output power $P_{CMAX,f,c}$ is set within the following bounds:

$$P_{CMAX\_L,f,c} \leq P_{CMAX,f,c} \leq P_{CMAX\_H,f,c} \text{ with}$$

$$P_{CMAX\_L,f,c}=\text{MIN}\{P_{EMAX,c}-\Delta T_{C,c}, (P_{PowerClass}-\Delta P_{PowerClass})-\text{MAX}(\text{MAX}(MPR_c+\Delta MPR_c, A-MPR_c)+\Delta T_{IB,c}+\Delta T_{C,c}+\Delta T_{RxSRS}, P\text{-}MPR_c)\}$$

$$P_{CMAX\_H,f,c}=\text{MIN}\{P_{EMAX,c}, P_{PowerClass}-\Delta P_{PowerClass}\}$$

where the lower bound is governed by the maximum allowed back-off MPR while both the upper and lower bounds are limited by the power class (power capability) $P_{power\ class}$ and a cell-specific limit class $P_{Max}$ (the $P_{EMAX,c}$). Other allowed power reductions accounting for e.g. filter attenuation ($\Delta T_C$) also reduce the lower bound at the edges of carriers but are not included in what follows for notational simplicity without loss of generality. The upper bound corresponds to the case in which the UE is not applying any power back-off and is limited by the power class and power limits only. The power class may be modified by $\Delta P_{powerclass}$ in case the maximum power capability must be reduced for e.g. exposure compliance (SAR).

Carrier Aggregation and Power Capability

In carrier aggregation (CA), the UE configures a maximum total power $P_{CMAX}$ for all aggregated serving cells of a CA combination. For FR1 the $P_{CMAX}$ is specified at the antenna connector and includes the power back-off applied on the serving cells part of the CA configuration; for inter-band UL CA the is essentially the sum of the configured power per cell and capped by the power class $\Delta P_{power\ class,CA}$ of the CA band combination:

The total configured maximum output power $P_{CMAX}$ shall be set within the following bounds:

$$P_{CMAX\_L} \leq P_{CMAX} \leq P_{CMAX\_H}$$

For uplink inter-band carrier aggregation with one serving cell c per operating band when same slot symbol pattern is used in all aggregated serving cells, $$P_{CMAX\_L}=\text{MIN}\{10 \log_{10}\Sigma\text{MIN}[p_{EMAX,c}/(\Delta t_{C,c}), p_{PowerClass,c}/(\text{MAX}(mpr_c\cdot\Delta mpr_c, a\text{-}mpr_c)\cdot\Delta t_{C,c}\cdot\Delta t_{IB,c}\cdot\Delta t_{RxSRS,c})\cdot p_{PowerClass,c}/\text{pm-}pr_c], P_{EMAX,CA}, P_{PowerClass,CA}-\Delta P_{PowerClass,CA}\}$$

$$P_{CMAX\_H}=\text{MIN}\{10 \log_{10}\Sigma p_{EMAX,c}, P_{EMAX,CA}, P_{PowerClass,CA}-\Delta P_{PowerClass,CA}\}$$

The configured total power $P_{CMAX}$ for all aggregated serving cells of a CA combination is used for prioritizations of transmission power when the UE is power limited.

Prioritizations for Transmission Power Reductions

For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$, where $\hat{P}_{CMAX}(i)$ is the linear value of $\hat{P}_{CMAX}(i)$ in transmission occasion i as defined in 8-1 of TS 38.101-1 for FR1 and 8-2 of TS38.101-2 for FR2, the UE allocates power to PUSCH/PUCCH/PRACH/SRS transmissions according to the following priority order (in descending order) so that the total UE transmit power for transmissions on serving cells in the frequency range is smaller than or equal to $\hat{P}_{CMAX}(i)$ for that frequency range in every symbol of transmission occasion i. When determining a total transmit power for serving cells in a frequency range in a symbol of transmission occasion i, the UE does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.

PRACH transmission on the Pcell
    PUCCH or PUSCH transmissions with higher priority index according to Clause 9
    For PUCCH or PUSCH transmissions with same priority index
      PUCCH transmission with HARQ-ACK information, and/or SR, and/or LRR, or PUSCH transmission with HARQ-ACK information
      PUCCH transmission with CSI or PUSCH transmission with CSI
      PUSCH transmission without HARQ-ACK information or CSI and, for Type-2 random access procedure, PUSCH transmission on the PCell
      SRS transmission, with aperiodic SRS having higher priority than semi-persistent and/or periodic SRS, or PRACH transmission on a serving cell other than the PCell In case of same priority order and for operation with carrier aggregation, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

Given a total power $P_{CMAX}$, the UE allocates power for transmission types in a priority order when power limited. This means that e.g. that the primary cell (PCell) is prioritized for a given transmission e.g. for simultaneous PUSCH transmissions on multiple serving cells.

The power class of the CA configuration can also be modified by a to account for MPE requirements by $\Delta P_{power\ class,CA}$ for concurrent uplink transmissions on more several uplink serving cells. This means that the UE would start prioritizing the uplink power at $\Delta P_{power\ class,CA}$ lower output power (dB scale). The conditions at which this is allowed is specified for selected cases and can depend on the uplink duty cycles on the serving cells. The power class for band combination (CA or dual-connectivity) may be different from the power-class for the constituent bands. In case the $P_{power\ class,CA}$ possibly modified by $\Delta P_{power\ class,CA}$ for the band combination is lower than the $P_{power\ class}$ for constituent band, transmission power on the latter would be prioritized (reduced).

Power Headroom Reporting

The power capability determines the power headroom (PH) reported in the power-headroom report (PH)

$$PH = P_{CMAX,f,c}(i) - [P_0 + \alpha_{f,c} PL_{f,c} + 10 \log M_{f,c}(i) + \Delta_{f,c}(i) + \delta_{f,c}(i)]$$

the ratio/difference (linear/dB) between the configured maximum output power (depending on the power class)

$$P_{CMAX,f,c}(i) \sim \min[\text{power class}, f(P_{power\ class}, \text{MPR}), P_{Max}]$$

and the estimated output power required for the uplink transmission scheduled by the BS. A positive value (in dB) means that there is remaining power available while a negative PH means that the uplink power is capped by the maximum power and that there is a power deficiency for the uplink allocation. The maximum output power is also reported in the PHR.

In case the maximum power is modified by $\Delta P_{power\ class}$ or P-MPR (or any other power back-off included in the $P_{CMAX,f,c}$) then the PH is changed for a given scheduled uplink transmission.

The PH can be based on an actual transmission with a scheduled uplink resource ($M_{f,c}(i)$ in the expression above) or a reference format without a scheduled resource and an assumption that all power back-off are set to zero (including P-MPR). The UE determines the PHR as follows [2]: determines whether PH value for an activated Serving Cell is based on real transmission or a reference format by considering the configured grant(s) or periodic/semi-persistent SRS transmissions and downlink control information which has been received until and including the PDCCH occasion in which the first UL grant for a new transmission is received since a PHR has been triggered if the PHR MAC CE is reported on an uplink grant received on the PDCCH or until the first uplink symbol of PUSCH transmission minus PUSCH preparation time as defined in subclause TS 38.214 if the PHR MAC CE is reported on a configured grant.

The $\Delta P_{powerclass}$ affects the PHR for both an actual transmission and the reference format for both PUSCH and SRS. The application of $\Delta P_{powerclass}$ in time is up to UE implementation.

PHR is reported for PUSCH (Type 1) and SRS (Type 3). PH can be either single-entry (for a serving cell) or multi-entry including serving cells of a MR-DC or UL CA band combination. The latter is configured for the said band combinations, otherwise single-entry.

The PHR can be either periodic (typically 20-50 ms) or triggered with phr-PeriodicTimer by events such as DL path loss changes affecting the UL power required or a P-MPR change if this is above a configurable threshold value. According to [3], a PHR shall be triggered if any of the following events occur:

phr-ProhibitTimer expires or has expired and the path loss has changed more than phr-Tx-PowerFactorChange dB [configurable threshold] for at least one RS used as pathloss reference for one activated Serving Cell of any MAC entity of which the active DL BWP is not dormant BWP since the last transmission of a PHR in this MAC entity when the MAC entity has UL resources for new transmission;

Relating to SAR and MPE compliance, a PHR is also triggered if the P-MPR is changed more than a configurable threshold with phr-Tx-PowerFactorChange for more than a few tenths of milliseconds (SAR a long-term average) when the UE has UL resources for new transmission:

there are UL resources allocated for transmission or there is a PUCCH transmission on this cell, and the required power backoff due to power management (as allowed by P-MPRc as specified in TS 38.101-1, TS 38.101-2, and TS 38.101-3) for this cell has changed more than phr-Tx-PowerFactorChange dB since the last transmission of a PHR when the MAC entity had UL resources allocated for transmission or PUCCH transmission on this cell.

According to 3GPP TS 38.213, PHR is defined as:

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell;

MPE P-MPR: the power backoff to meet the MPE FR2 requirements for a Serving Cell operating on FR2.

RRC controls Power Headroom reporting by configuring the following parameters:

phr-PeriodicTimer;
phr-ProhibitTimer;
phr-Tx-PowerFactorChange;
phr-Type2OtherCell;
phr-ModeOtherCG;
multiplePHR;
mpe-Reporting-FR2;
mpe-ProhibitTimer;
mpe-Threshold;
numberOfN;
mpe-ResourcePool;
twoPHRMode.

A Power Headroom Report (PHR) shall be triggered if any of the following events occur:

phr-ProhibitTimer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

phr-PeriodicTimer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

activation of an SCG;

addition of the PSCell except if the SCG is deactivated (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;

if mpe-Reporting-FR2 is configured, and mpe-ProhibitTimer is not running:

the measured P-MPR applied to meet FR2 MPE requirements as specified in TS 38.101-2 [15] is equal to or larger than mpe-Threshold for at least one activated FR2 Serving Cell since the last transmission of a PHR in this MAC entity; or the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.

in which case the PHR is referred below to as 'MPE P-MPR report'.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission on configured grant by this HARQ process, but not yet transmitted by lower layers, it is up to UE implementation how to handle the PHR content.

Figure 2:
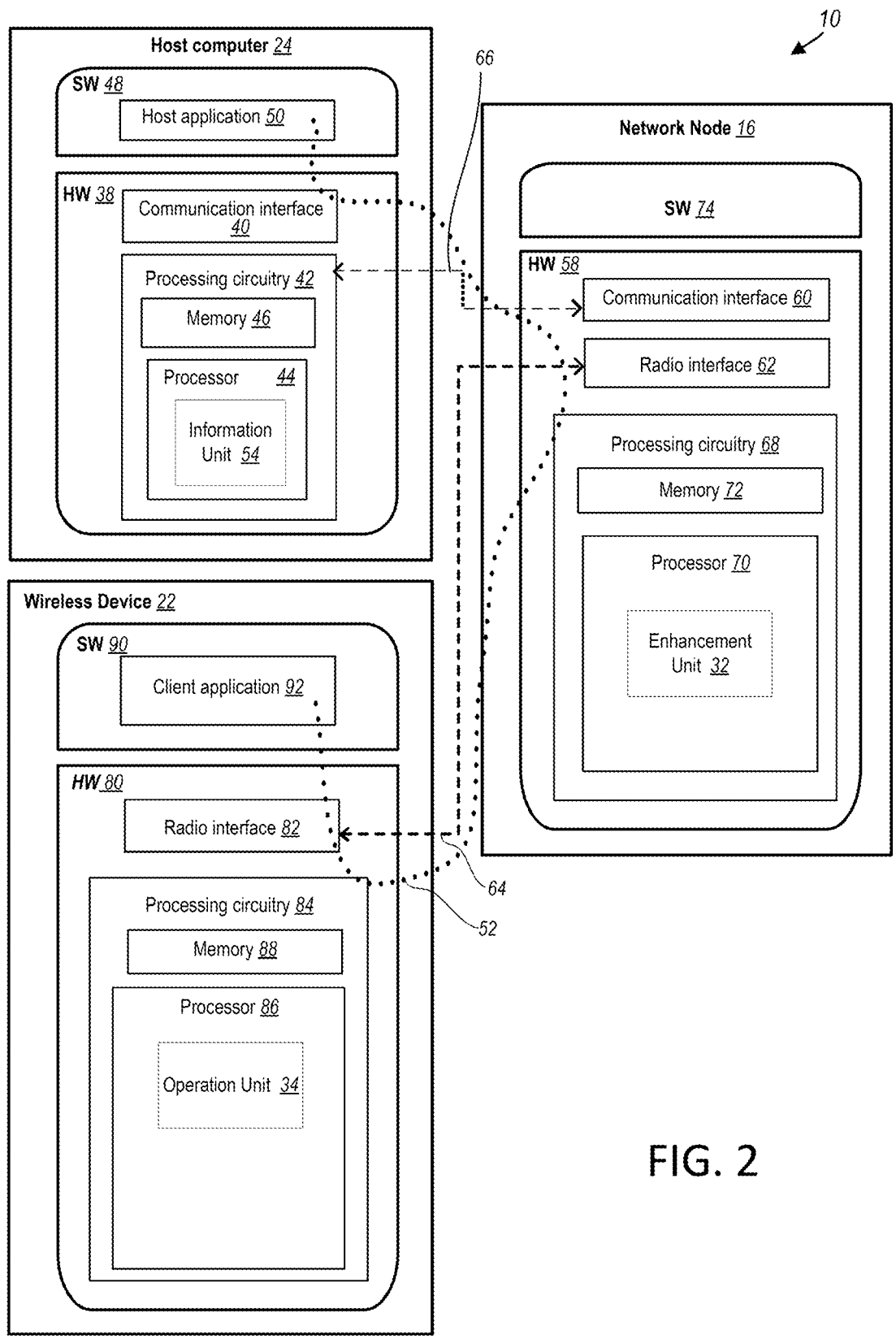
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as enhancement unit 32, and operation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
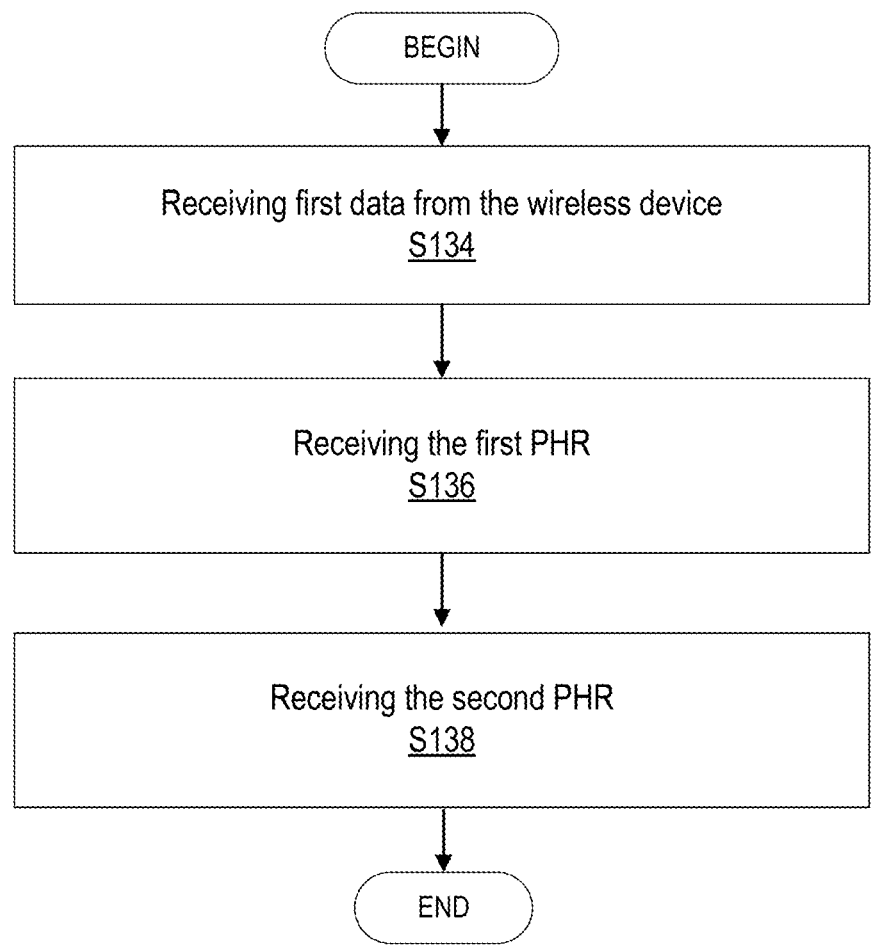
FIG. 7 is a flowchart of an example process in a network node according to some embodiments of the present disclosure.

FIG. 7 is a flowchart of an example process in a network node 16 according to some embodiments of the present disclosure. One or more Blocks and/or functions performed by network node 16 may be performed by one or more elements of network node 16 such as by enhancement unit 32 in processing circuitry 68, processor 70, radio interface 62, etc. In one or more embodiments, network node 16 such as via one or more of processing circuitry 68, processor 70, enhancement unit 32, communication interface 60 and radio interface 62 is configured to receive (Block S134) first data from the wireless device 22, where the first data is transmitted from the wireless device using a first USIM and the at least two UL Tx, as described herein. In one or more embodiments, network node 16 such as via one or more of processing circuitry 68, processor 70, enhancement unit 32, communication interface 60 and radio interface 62 is configured to receive (Block S136) a first PHR from the wireless device, where the first PHR comprises a configured first maximum output power for uplink transmission for the wireless device, as described herein. In one or more embodiments, network node 16 such as via one or more of processing circuitry 68, processor 70, enhancement unit 32, communication interface 60 and radio interface 62 is configured to receive (Block S138) a second PHR from the wireless device, where the second PHR includes a configured second maximum output power for uplink transmission for the wireless device, wherein the configured second maximum output power for uplink transmission is reduced compared to the first maximum output power for uplink transmission, as described herein.

According to one or more embodiments, the first PHR report is based on the transmission the first data and the second PHR is based on the transmission of a second data, where the second data is transmitted from the wireless device to the second PLMN using a second USIM and one of the at least two UL Tx. According to one or more embodiments, the second PHR decreases compared to the first PHR. According to one or more embodiments, the first PHR includes at least one PCMAX value and the second PHR includes at least one PCMAX value, where the PCMAX value included in the second PHR is PCMAX_C_00.

In one or more alternative embodiments, network node 16 such as via one or more of processing circuitry 68, processor 70, enhancement unit 32, communication interface 60 and radio interface 62 is configured to receive (Block S134) first data from the wireless device 22, where the first data is transmitted from the wireless device using a first USIM and one of the at least two UL Tx, as described herein. In one or more embodiments, network node 16 such as via one or more of processing circuitry 68, processor 70, enhancement unit 32, communication interface 60 and radio interface 62 is configured to receive (Block S136) a first PHR from the wireless device, where the first PHR comprises a configured first maximum output power for uplink transmission for the wireless device, as described herein. In one or more embodiments, network node 16 such as via one or more of processing circuitry 68, processor 70, enhancement unit 32, communication interface 60 and radio interface 62 is configured to receive (Block S138) a second PHR from the wireless device, where the second PHR includes a configured second maximum output power for uplink transmission for the wireless device, wherein the configured second maximum output power for uplink transmission is increased compared to the first maximum output power for uplink transmission, as described herein.

According to one or more embodiments, the first PHR report is based on the transmission the first data and the second PHR is based on the transmission of a second data, where the second data is transmitted from the wireless device to the second PLMN using a second USIM and the at least two UL Tx.

Figure 8:
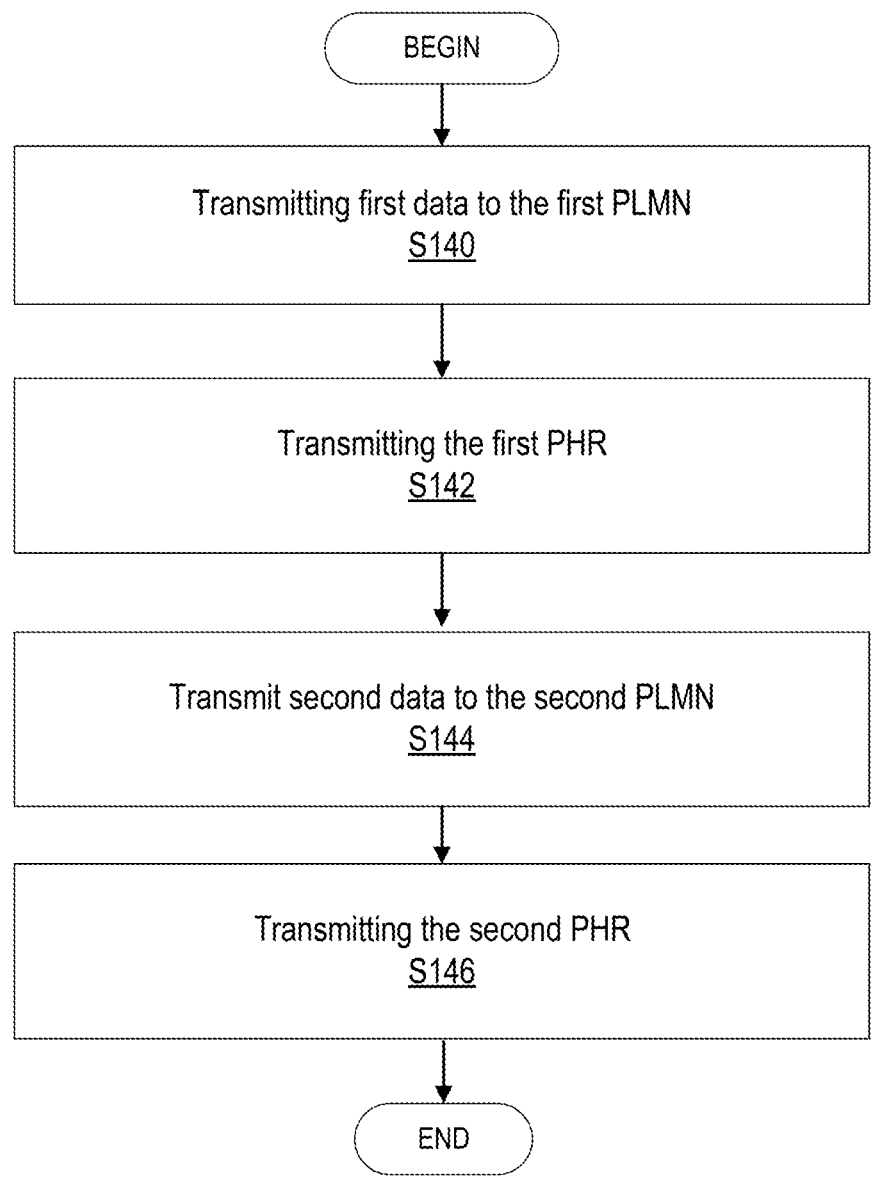
FIG. 8 is a flowchart of an example process in a wireless device according to some embodiments of the present disclosure.

FIG. 8 is a flowchart of an example process in a wireless device 22 according to some embodiments of the present disclosure. One or more Blocks and/or functions performed by wireless device 22 may be performed by one or more elements of wireless device 22 such as by operation unit 34 in processing circuitry 84, processor 86, radio interface 82, etc. In one or more embodiments, wireless device such as via one or more of processing circuitry 84, processor 86, operation unit 34 and radio interface 82 is configured to transmit first data (S140) to the first PLMN using a first USIM and the at least two UL Tx, as described herein. In one or more embodiments, wireless device such as via one or more of processing circuitry 84, processor 86, operation unit 34 and radio interface 82 is configured to transmit a first power headroom report, PHR, (S142) to the first PLMN, where the first PHR includes a configured first maximum output power for uplink transmission for the wireless device, as described herein. In one or more embodiments, wireless device such as via one or more of processing circuitry 84, processor 86, operation unit 34 and radio interface 82 is configured to transmit second data (S144) to the second PLMN using a second USIM and one of the at least two UL Tx, as described herein. In one or more embodiments, wireless device such as via one or more of processing circuitry 84, processor 86, operation unit 34 and radio interface 82 is configured to transmit a second PHR (S146) to the first PLMN, where the second PHR comprises a configured second maximum output power for uplink transmission for the wireless device, where the configured second maximum output power for uplink transmission is reduced compared to the first maximum output power for uplink transmission, as described herein.

According to one or more embodiments, the first PHR report is based on the transmission of the first data and the second PHR is based on the transmission of the second data. According to one or more embodiments, the second PHR decreases compared to the first PHR. According to one or more embodiments, the first PHR comprises at least one PCMAX value and the second PHR comprises at least one PCMAX value, wherein the PCMAX value comprised in the second PHR is PCMAX_C_00.

In alternative embodiments, wireless device such as via one or more of processing circuitry 84, processor 86, operation unit 34 and radio interface 82 is configured to transmit first data (S140) to the first PLMN using a first USIM and one the at least two UL Tx, as described herein. In one or more embodiments, wireless device such as via one or more of processing circuitry 84, processor 86, operation unit 34 and radio interface 82 is configured to transmit a first power headroom report, PHR, (S142) to the first PLMN, where the first PHR includes a configured first maximum output power for uplink transmission for the wireless device, as described herein. In one or more embodiments, wireless device such as via one or more of processing circuitry 84, processor 86, operation unit 34 and radio interface 82 is configured to transmit second data (S144) to the second PLMN using a second USIM and the at least two UL Tx, as described herein. In one or more embodiments, wireless device such as via one or more of processing circuitry 84, processor 86, operation unit 34 and radio interface 82 is configured to transmit a second PHR (S146) to the first PLMN, where the second PHR comprises a configured second maximum output power for uplink transmission for the wireless device, where the configured second maximum output power for uplink transmission is increased compared to the first maximum output power for uplink transmission, as described herein.

Having generally described arrangements for PHR for MUSIM, details for these arrangements, functions and processes are provided as follows, and which may be implemented by the network node 16, wireless device 22 and/or host computer 24.

Embodiments to provide PHR for MUSIM.

Scenarios for Single Carrier Operation on First PLMN

Figure 9:
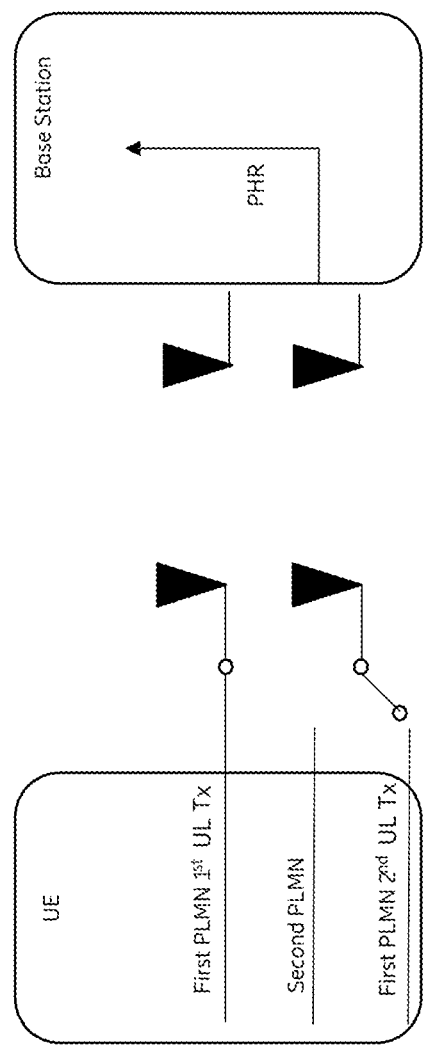
FIG. 9 illustrates single carrier operation for the first PLMN according to some embodiments of the present disclosure.

FIG. 9 illustrates single carrier operation for the first PLMN. In FIG. 9 The first PLMN is using single carrier operation to communicate with the UE, where the UE architecture use Dual-Rx/Dual-Tx. Where 2 Tx antenna ports supporting 2 Tx transceivers, the uplink transmission can apply UL-MIMO or UL Tx diversity with antenna switching scheme. Other UE architectures using more than one Tx chain/Tx transceiver is also within the scope of the embodiments, where more than one Tx antenna port is used for transmitting uplink signals/data to the gNB. Generally, when a PHR is triggered, under the conditions defined in 3GPP TS 38.321, there is at least one of the parameters, e.g. PC_Max, reported for the first PLMN, according to the Tables 6.1.3.8-1-3. When both 2 UL Tx are used by the first PLMN the PC_Max is reported as a first PC_max. Once one of the Tx is used by the second PLMN, the PC_Max is reported as a second PC_max which will indicate a power reduction compared to the first PC_max. Further, in the embodiment when the 2 UL Tx are used by both the first PLMN and the second PLMN, the PC_Max is reported as a first PC_max. Once both 2 UL Tx are used by the first PLMN again the PC_Max is reported as a second PC_max, which will indicate a power increase compared to the first PC_max.

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 6.1.3.8-3

Effective power reduction for MPE P-MPR

| MPE | Measured P-MPR value |
|---|---|
| 0 | P-MPR_00 |
| 1 | P-MPR_01 |
| 2 | P-MPR_02 |
| 3 | P-MPR_03 |

In one embodiment the power reduction is for the second PC_max. The second PC_max is reported as PCMAX_C being one value higher, as an example. Once the higher PCMax_C is received in the PHR for the specific carrier, the gNB schedules data assuming less power being available.

TABLE 1

Reported PC_MAX values

| Reported value | Measured quantity value | Unit |
|---|---|---|
| PCMAX_C_00 | $P_{CMAX,c,f} < -29$ | dBm |
| PCMAX_C_01 | $-29 \leq P_{CMAX,c,f} < -28$ | dBm |
| PCMAX_C_02 | $-28 \leq P_{CMAX,c,f} < -27$ | dBm |
| ... | ... | ... |
| PCMAX_C_61 | $31 \leq P_{CMAX,c,f} < 32$ | dBm |
| PCMAX_C_62 | $32 \leq P_{CMAX,c,f} < 33$ | dBm |
| PCMAX_C_63 | $33 \leq P_{CMAX,c,f}$ | dBm |

Scenarios for CA or DC Operation on First PLMN

Figure 10:
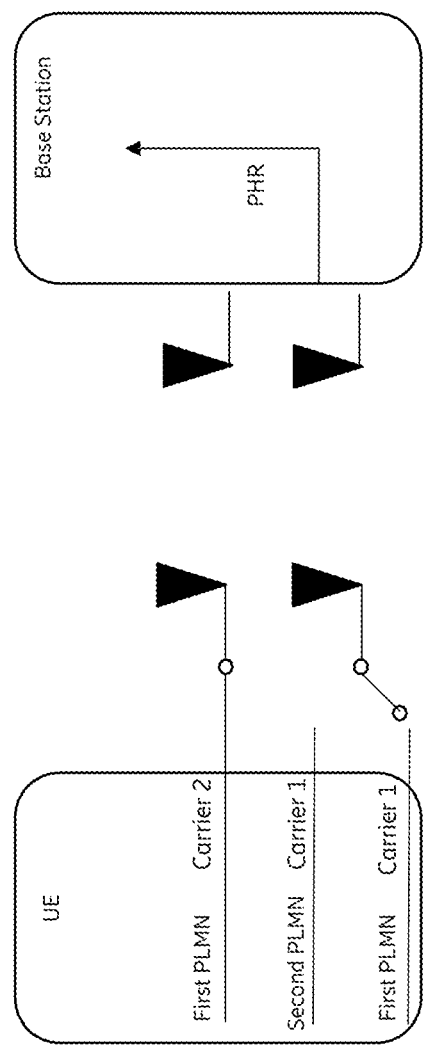
FIG. 10 illustrates CA/DC with multiple carrier operation for the first PLMN according to some embodiments of the disclosure.

FIG. 10 illustrates CA/DC with multiple carrier operation for the first PLMN. When the first PLMN is using CA/DC operation to communicate with an UE having an UE architecture including more than one Tx chain/Tx transceiver such as a Dual-Rx/Dual-Tx, more than one Tx antenna port can be used for transmitting uplink signals/data to the gNB. For example, for an uplink transmission using 2 Tx antenna ports supporting 2 Tx transceivers, the uplink transmission can be applied on multiple UL carriers. When the PHR is triggered, under the conditions defined in 3GPP TS 38.321, there is at least one of the parameters, e.g. PC_Max, reported in the tables below with multiple entries. When both 2 UL Tx are used by the first PLMN with multiple UL carriers the PC_Max is reported as a first PC_max. Once one of the Tx is used by the second PLMN, the PC_Max is reported as a second PC_max which indicate a power reduction compared to the first PC_max. Further, when 2 UL Tx are used by both the first PLMN and the second PLMN, the PC_Max is reported as a first PC_max. Once both 2 UL Tx are used by the first PLMN again for multiple UL carriers the PC_Max is reported as a second PC_max which will indicate a power increase compared to the first PC_max. FIG. 11 shows Multiple Entry PHR MAC CE with the highest ServCellIndex of Serving Cell with configured uplink is less than 8

(diagram (a)) and Multiple Entry PHR MAC CE with the highest ServCellIndex of Serving Cell with configured uplink is equal to or higher than 8 (diagram (b)).

In one of the embodiments the aim is to apply the power reduction for one of the entries (carriers) or set its PH to minimum. For example, the Pcmax,c not included for a virtual transmission, V="1"). In this case, the UE includes V=1 for the serving cell and set its PH to the POWER_HEADROOM_0 (PH<−32 dB) or any indication with PH<0 which also indicates that the UE power is not sufficient for scheduling the UL grant.

In one embodiment the power reduction is for the second PC_max. The second PC_max is reported as PCMAX_C_00. Once received PC_MAX_C_00 is received in PHR for the specific carrier, gNB stops scheduling data on the carrier assuming that there is not sufficient power available.

TABLE 2

Reported PC_MAX values

| Reported value | Measured quantity value | Unit |
|---|---|---|
| PCMAX_C_00 | $P_{CMAX,c,f} < -29$ | dBm |
| PCMAX_C_01 | $-29 \leq P_{CMAX,c,f} < -28$ | dBm |
| PCMAX_C_02 | $-28 \leq P_{CMAX,c,f} < -27$ | dBm |
| . . . | . . . | . . . |
| PCMAX_C_61 | $31 \leq P_{CMAX,c,f} < 32$ | dBm |
| PCMAX_C_62 | $32 \leq P_{CMAX,c,f} < 33$ | dBm |
| PCMAX_C_63 | $33 \leq P_{CMAX,c,f}$ | dBm |

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

USIM Universal Subscriber Identity Module, a physical SIM card or an eSIM
PHR Power Headroom Report
PLMN Public Land Mobile Network
BWP Bandwidth Part
DSDA Dual SIM Dual Active
DSDS Dual SIM Dual Standby
CA Carrier Aggregation
DC Dual Connectivity CBG Code Block Group
CCE Control Channel Element
DAI Downlink Assignment Indicator
DCI Downlink Control Information
HARQ Hybrid Automatic Repeat Request
MIMO Multiple Input Multiple Output
NACK Not-acknowledgment
PDCCH Physical Downlink Control Channel
PUSCH Physical Uplink Shared Data Channel
SRS Sounding Reference Signal
PUCCH Physical Uplink Control Channel
TB Transport Block
UCI Uplink Control Information It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method implemented by a wireless device comprising a at least two Universal Subscriber Identity Modules, USIMs, and at least two uplink transmitters, UL Tx, and configured to communicate with a first public mobile network, PLMN, and a second PLMN different from the first PLMN, the method comprising:
transmitting first data to the first PLMN using a first USIM and the at least two UL Tx;
transmitting a first power headroom report, PHR, to the first PLMN based on the first data, the first PHR comprising a configured first maximum output power for uplink transmission for the wireless device;
transmitting second data to the second PLMN using a second USIM and one of the at least two UL Tx used for transmitting the first data; and
transmitting a second PHR to the first PLMN based on the second data, the second PHR comprising a configured second maximum output power for uplink transmission for the wireless device, the configured second maximum output power for uplink transmission being less than the first maximum output power for uplink transmission.

2. The method of claim 1, wherein a power headroom, PH, associated with one or both of the first PHR and the second PHR is defined as a difference between a configured maximum output power for uplink transmission for the wireless device and an estimated output power required for the uplink transmission scheduled by a network node.

3. The method of claim 1, wherein a second PH associated with the second PHR decreases when compared to a first PH associated with the first PHR.

4. The method of claim 1, wherein the at least UL Tx use UL-MIMO or Tx diversity.

5. The method of claim 1, wherein the wireless device is configured for dual connectivity when in communication with one or both of the first PLMN and the second PLMN.

6. The method of claim 5, wherein the wireless device communicates with the first PLMN using a first UL Tx on a first UL carrier and a second UL Tx on a second UL carrier, and wherein the wireless device communicates with the second PLMN using at least one of the two UL Tx on the first UL carrier.

7. The method of claim 1, wherein the wireless device is configured for carrier aggregation when in communication with one or both of the first PLMN and the second PLMN.

8. The method of claim 1, wherein the first PHR comprises at least one PCMAX value and the second PHR comprises at least one PCMAX value, the PCMAX value comprised in the second PHR being less than −29 decibel-milliwatts, dBm.

9. The method of claim 1, wherein the wireless device comprises a Multiple USIM, MUSIM.

10. A wireless device configured to comprise at least two Universal Subscriber Identity Modules, USIMs, and at least two uplink transmitters, UL Tx, and configured to communicate with a first public mobile network, PLMN, and a second PLMN different from the first PLMN, the wireless device comprising a radio interface and processing circuitry configured to:
transmit first data to the first PLMN using a first USIM and the at least two UL Tx;
transmit a first power headroom report, PHR, to the first PLMN based on the first data, the first PHR comprising a configured first maximum output power for uplink transmission for the wireless device;
transmit second data to the second PLMN using a second USIM and one of the at least two UL Tx used for transmitting the first data; and
transmit a second PHR to the first PLMN based on the second data, the second PHR comprising a configured second maximum output power for uplink transmission for the wireless device, the configured second maximum output power for uplink transmission being less than the first maximum output power for uplink transmission.

11. The wireless device of claim 10, wherein a power headroom, PH, associated with one or both of the first PHR and the second PHR is defined as a difference between a configured maximum output power for uplink transmission for the wireless device and an estimated output power required for the uplink transmission scheduled by a network node.

12. The wireless device of claim 10, wherein a second PH associated with the second PHR decreases when compared to a first PH associated with the first PHR.

13. The wireless device of claim 10, wherein the at least two UL Tx use UL-MIMO or Tx diversity.

14. The wireless device of claim 10, wherein the wireless device is configured for dual connectivity when in communication with one or both of the first PLMN and the second PLMN.

15. The wireless device of claim 10, wherein the wireless device is configured for carrier aggregation when in communication with one or both of the first PLMN and the second PLMN.

16. The wireless device of claim 15, wherein the wireless device communicates with the first PLMN using a first UL Tx on a first UL carrier and a second UL Tx on a second UL carrier, and wherein the wireless device communicates with the second PLMN using at least one of the two UL Tx on the first UL carrier.

17. The wireless device of claim 10, wherein the first PHR comprises at least one PCMAX value and the second PHR comprises at least one PCMAX value, the PCMAX value comprised in the second PHR being less than −29 decibel-milliwatts, dBm.

18. The wireless device of claim 10, wherein the wireless device comprises a Multiple USIM, MUSIM.

19. A method implemented in a network node that is operating in a first public mobile network, PLMN, comprising a wireless device, the wireless device comprising at least two Universal Subscriber Identity Modules, USIMs, and at least two uplink transmitters, UL Tx, and being configured to communicate with the first PLMN and a second PLMN different from the first PLMN, the method comprising:
    receiving first data from the wireless device, wherein the first data is transmitted from the wireless device using a first USIM and the at least two UL Tx;
    receiving, from the wireless device, a first power headroom report, PHR, based on the first data, the first PHR comprising a configured first maximum output power for uplink transmission for the wireless device; and
    receiving, from the wireless device, a second PHR, based on second data, the second data being transmitted from the wireless device to the second PLMN using a second USIM and one of the at least two UL Tx used for transmitting the first data, the second PHR comprising a configured second maximum output power for uplink transmission for the wireless device, the configured second maximum output power for uplink transmission being less than the first maximum output power for uplink transmission.

20. The method of claim 19, wherein a power headroom, PH, associated with one or both of the first PHR and the second PHR is defined as a difference between a configured maximum output power for uplink transmission for the wireless device and an estimated output power required for the uplink transmission scheduled by the network node.

21. The method of claim 19, wherein a second PH associated with the second PHR decreases when compared to a first PH associated with the first PHR.

22. The method of claim 19, wherein the first PHR comprises at least one PCMAX value and the second PHR comprises at least one PCMAX value, the PCMAX value comprised in the second PHR being less than −29 decibel-milliwatts, dBm.

23. A network node configured to operate in a first public land mobile network, PLMN, comprising a wireless device, the wireless device comprising at least two Universal Subscriber Identity Modules, USIMs, and at least two uplink transmitters, UL Tx, and being configured to communicate with the first PLMN and a second PLMN different from the first PLMN, the network node comprising a radio interface and processing circuitry configured to:
    receive first data from the wireless device, wherein the first data is transmitted from the wireless device using a first USIM and the at least two UL Tx;
    receive, from the wireless device, a first power headroom report, PHR, based on the first data, the first PHR comprising a configured first maximum output power for uplink transmission for the wireless device; and
    receive, from the wireless device, a second PHR, based on second data, the second data being transmitted from the wireless device to the second PLMN using a second USIM and one of the at least two UL Tx used for transmitting the first data, the second PHR comprising a configured second maximum output power for uplink transmission for the wireless device, the configured second maximum output power for uplink transmission being less than the first maximum output power for uplink transmission.

24. The network node of claim 23, wherein a power headroom, PH, associated with one or both of the first PHR and the second PHR is defined as a difference between a configured maximum output power for uplink transmission for the wireless device and an estimated output power required for the uplink transmission scheduled by the network node.

25. The network node of claim 23, wherein a second PH associated with the second PHR decreases when compared to a first PH associated with the first PHR.

26. The network node of claim 23, wherein the first PHR comprises at least one PCMAX value and the second PHR comprises at least one PCMAX value, the PCMAX value comprised in the second PHR being less than −29 decibel-milliwatts, dBm.

\* \* \* \* \*

UNITED STATES PATENT AND TRADEMARK OFFICE
CERTIFICATE OF CORRECTION

Page 1 of 4

PATENT NO. : 12,082,125 B1
APPLICATION NO. : 18/304862
DATED : September 3, 2024
INVENTOR(S) : Chen Larsson et al.

It is certified that error appears in the above-identified patent and that said Letters Patent is hereby corrected as shown below:

On the Title Page

In Item (57), under "ABSTRACT", in Column 2, Line 4, delete "public mobile network," and insert -- public land mobile network, --, therefor.

In the Drawings

In Fig. 4, Sheet 3 of 9, for Tag "S114", Line 2, delete "recives" and insert -- receives --, therefor.

In the Specification

In Column 1, Line 37, delete "node configurable" and insert -- node is configurable --, therefor.

In Column 1, Line 51, delete "configured receive," and insert -- configured to receive, --, therefor.

In Column 1, Line 60, delete "public mobile network," and insert -- public land mobile network, --, therefor.

In Column 2, Line 18, delete "device configured" and insert -- device is configured --, therefor.

In Column 2, Line 21, delete "public mobile network," and insert -- public land mobile network, --, therefor.

In Column 2, Line 41, delete "public mobile network," and insert -- public land mobile network, --, therefor.

In Column 2, Line 66, delete "node configurable" and insert -- node is configurable --, therefor.

In Column 3, Line 13, delete "configured receive," and insert -- configured to receive, --, therefor.

Signed and Sealed this
Sixth Day of May, 2025

Coke Morgan Stewart
*Acting Director of the United States Patent and Trademark Office*

CERTIFICATE OF CORRECTION (continued)
U.S. Pat. No. 12,082,125 B1

In Column 3, Line 22, delete "public mobile network," and insert -- public land mobile network, --, therefor.

In Column 3, Line 41, delete "transmission the" and insert -- transmission of the --, therefor.

In Column 3, Line 46, delete "device configured" and insert -- device is configured --, therefor.

In Column 3, Line 49, delete "public mobile network," and insert -- public land mobile network, --, therefor.

In Column 4, Line 3, delete "public mobile network," and insert -- public land mobile network, --, therefor.

In Column 5, Line 34, delete "transmissions to" and insert -- transmissions --, therefor.

In Column 6, Line 38, delete "(RRU) Remote" and insert -- (RRU), Remote --, therefor.

In Column 6, Line 59, delete "equipped (LEE)," and insert -- equipment (LEE), --, therefor.

In Column 6, Line 62, delete "(NB-IOT)" and insert -- (NB-IoT) --, therefor.

In Column 7, Line 3, delete "(RRU) Remote" and insert -- (RRU), Remote --, therefor.

In Column 8, Line 66, delete "Circuitry)" and insert -- Circuits) --, therefor.

In Column 9, Line 37, delete "and or" and insert -- and/or --, therefor.

In Column 10, Line 5, delete "Circuitry)" and insert -- Circuits) --, therefor.

In Column 10, Line 50, delete "Circuitry)" and insert -- Circuits) --, therefor.

In Column 11, Line 26, delete "Aggregation." and insert -- Aggregation --, therefor.

In Column 12, Line 2, delete "transmission power" and insert -- transmission power is --, therefor.

In Column 12, Line 38, delete "base band." and insert -- baseband. --, therefor.

In Column 13, Line 25, delete "purpose" and insert -- purpose. --, therefor.

In Column 13, Line 28, delete "UE" and insert -- UE. --, second occurrence therefor.

In Column 13, Lines 63-64, delete " $P_{CMAX,f,c}(i) \sim \min P_{power\ class}, f(P_{power\ class}, MPR), P_{Max}]$ " and insert

CERTIFICATE OF CORRECTION (continued)
U.S. Pat. No. 12,082,125 B1

"$P_{CMAX,f,c}(i) \sim \min[P_{power\ class}, f(P_{power\ class}, MPR), P_{Max}]$" --, therefor.

In Column 13, Line 67, delete "signaling" and insert -- signaling. --, therefor.

In Column 14, Line 4, delete "requirements" and insert -- requirements. --, therefor.

In Column 14, Lines 56-57, "$P_{CMAX\_H} = MIN\{10 \log_{10} \Sigma p_{EMAX,c}, P_{EMAX,CA}, P_{PowerClass,CA} - \Delta P_{PowerClass,CA}$" and insert -- $P_{CMAX\_H} = MIN\{10 \log_{10} \Sigma p_{EMAX,c}, P_{EMAX,CA}, P_{PowerClass,CA} - \Delta P_{PowerClass,CA}\}$ --, therefor.

In Column 14, Line 67, delete "$\hat{P}_{CMAX}(i)$" and insert -- $P_{CMAX}(i)$ --, second occurrence therefor.

In Column 15, Line 44, delete "power limited." and insert -- power is limited. --, therefor.

In Column 15, Line 49, delete "by a to account" and insert -- to account --, therefor.

In Column 15, Line 50, delete "on more" and insert -- on --, therefor.

In Column 15, Line 58, delete "$\Delta P_{power\ class,CA}$for" and insert -- $AP_{power\ class,CA}$ for --, therefor.

In Column 15, Line 64, delete "power headroom report (PH)" and insert -- power headroom report (PHR) --, therefor.

In Column 16, Line 4, delete "$P_{CMAX,f,c}(i) \sim \min[power\ class, f(P_{power\ class}, MPR), P_{Max}]$" and insert -- $P_{CMAX,f,c}(i) \sim \min[P_{power\ class}, f(P_{power\ class}, MPR), P_{Max}]$ --, therefor.

In Column 21, Line 47, delete "transmission the" and insert -- transmission of the --, therefor.

In Column 22, Line 16, delete "transmission the" and insert -- transmission of the --, therefor.

In Column 24, Line 35, delete "PCMAX,c,f" and insert -- $P_{CMAX,c,f}$ --, therefor.

In Column 25, Line 7, delete "V="1")." and insert -- (V="1"). --, therefor.

In Column 27, Line 9, delete "Physical Uplink Shared Data Channel" and insert -- Physical Uplink Shared Channel --, therefor.

In the Claims

In Column 27, Lines 26-27, in Claim 1, delete "public mobile network," and insert -- public land mobile network, --, therefor.

In Column 28, Line 11, in Claim 10, delete "public mobile network," and insert -- public land mobile network, --, therefor.

In Column 28, Line 65, in Claim 19, delete "public mobile network," and insert -- public land mobile network, --, therefor.